(12) United States Patent
Michaelis et al.

(10) Patent No.: US 8,031,842 B1
(45) Date of Patent: Oct. 4, 2011

(54) DUAL MODERN ARCHITECTURE TO SUPPORT THE TRANSFER OF NON-BAUDOT TTY TELEPHONE CALLS

(75) Inventors: Paul Roller Michaelis, Louisville, CO (US); Richard A. Windhausen, Boulder, CO (US)

(73) Assignee: Avaya Inc., Basking Ridge, NJ (US)

( * ) Notice: Subject to any disclaimer, the term of this patent is extended or adjusted under 35 U.S.C. 154(b) by 1464 days.

(21) Appl. No.: 11/482,027

(22) Filed: Jul. 5, 2006

(51) Int. Cl.
H04M 11/00 (2006.01)

(52) U.S. Cl. .......................... 379/52; 379/45; 379/90.01

(58) Field of Classification Search .................. 379/52, 379/45, 265.02, 265.09, 90.01, 93.01, 93.05, 379/93.07, 93.17, 93.23, 93.26, 93.35, 93.32, 379/93.34; 455/404, 3.06
See application file for complete search history.

(56) References Cited

U.S. PATENT DOCUMENTS

| | | | | |
|---|---|---|---|---|
| 5,253,285 A | * | 10/1993 | Alheim | 379/52 |
| 5,351,288 A | | 9/1994 | Engelke et al. | |
| 5,684,825 A | | 11/1997 | Ko | |
| 5,787,364 A | * | 7/1998 | Exner et al. | 455/560 |
| 5,870,457 A | * | 2/1999 | Mumford | 379/93.09 |
| 5,905,476 A | | 5/1999 | McLaughlin et al. | |
| 5,940,475 A | * | 8/1999 | Hansen | 379/52 |
| 6,011,968 A | | 1/2000 | Patel et al. | |
| 6,442,242 B1 | * | 8/2002 | McAllister et al. | 379/67.1 |
| 6,480,531 B1 | | 11/2002 | Malhotra | |
| 6,724,886 B1 | * | 4/2004 | Watson | 379/265.02 |
| 7,567,653 B1 | * | 7/2009 | Michaelis | 379/52 |
| 7,587,034 B2 | * | 9/2009 | Olafsson et al. | 379/93.35 |
| 2002/0085703 A1 | * | 7/2002 | Proctor | 379/265.02 |
| 2006/0058049 A1 | | 3/2006 | McLaughlin et al. | |

OTHER PUBLICATIONS

VSAT Plus II Version 2, System Overview Revision 06, PolarSat, Nov. 2005, Final.
Broersma et al.; Throughput of ADSL Modems; Memorandum No. 1482; 17 pages.
Textgateway "T-Hyubrid"—connects analog with digital; http://www.omnitor.se/eng/textgateway_en.html; printed on May 17, 2006; 4 pages.

* cited by examiner

Primary Examiner — Melur Ramakrishnaiah
(74) Attorney, Agent, or Firm — Sheridan Ross P.C.

(57) ABSTRACT

A telecommunications system 100 is provided that includes a plurality of TTY devices 124a-n, a switching system 104 to switch a call to a selected one of the plurality of TTY devices; and back-to-back modems 132a-m comprising first and second modems 136 and 140. The first modem 136 faces the TTY devices 124a-n and the second modem 140 faces a set of outgoing trunks.

10 Claims, 4 Drawing Sheets

DUAL MODERN ARCHITECTURE TO SUPPORT THE TRANSFER OF NON-BAUDOT TTY TELEPHONE CALLS

FIELD OF THE INVENTION

The invention relates generally to telecommunication systems and particularly to telecommunications systems for the hearing impaired.

BACKGROUND OF THE INVENTION

TeleTYpewriters or TTYs are typewriter-style devices for communicating alphanumeric information over telecommunication networks. TTYs are equipped with modems, which accept digital data, and modulate it into a form suitable for transmission over the PSTN such that a corresponding receiving modem can demodulate the signal back into the original digital data.

TTYs have found particular utility in enabling the hearing and speech impaired to communicate over the Public Switched Telephone Network or PSTN. This type of TTY is referred to as a TTY/Telecommunication Device for the Deaf or TDD. The TTY transmission protocol most commonly used in the United States (45.45 baud Frequency Shift Keying or FSK Baudot signaling) has no carrier tone. For this reason, a Baudot TTY call can be put on hold or transferred to another party without causing the automatic disconnect that would ordinarily occur with devices requiring a continuous carrier tone. A drawback of the 45.45 baud Baudot protocol is that the maximum transmission speed is approximately six characters per second, which is considerably slower than most people are able to type.

Due to this problem, the International Telecommunications Union ("ITU") (formerly known as the CCITT) has set various modulation standards for modems that allow much faster data transmission rates. Examples of ITU standards are V.21 (used in the European Union), V.22, V.22 Bis, V.32, V.32 Bis, and V.34. In the United States, prior to the adoption of ITU standards, various "Bell standards" were established. Examples of Bell standards are Bell 103, Bell 202, and Bell 212. As used herein, an "ITU modem" is a modem that may operate using an ITU modulation/demodulation protocol (or standard). Typically, ITU modems may also operate in at least one Bell modulation/demodulation protocol. A "Bell modem" may operate in a Bell modulation/demodulation protocol. Most modems currently being sold in the United States are ITU modems that are capable of transmitting and receiving in various ITU modulation/demodulation protocols as well as Bell modulation/demodulation protocols. The term "ASCII modem" is sometimes used to refer to an ITU or Bell modem.

Despite the significant speed advancement of these protocols relative to the Baudot protocol, calls using the ITU protocols cannot be put on hold or transferred without disconnecting the call. TTYs using the protocols have a "carrier tone" which is a constant audible signal. Information is exchanged by varying the amplitude and/or frequency of the carrier tone. If this signal is lost because the call is placed on hold or transferred, the other TTY will hang up and not reestablish the connection with a different modem. Modems are very inflexible in their protocol requirements and will not operate properly or will abort the call if the protocol settings are wrong. Because it is not possible to transfer a call from one physical workstation to another, many contact centers servicing the hearing and speech impaired require agents to physically switch seats, while the call is in progress, to have a new agent service the call. In addition to being inconvenient, this approach prevents the call center from load balancing among multiple call centers that are part of the same enterprise. The use of carrier tones poses significant obstacles to the operation and effectiveness of Section 508-sensitive government agencies, call centers, medical facilities, and Public Safety Access Points or PSAPs. Because of the carrier tone, the TTY calls cannot be put on hold or serviced by an automated attendant application to route the call within the enterprise network.

This problem has been largely overcome in Voice over IP or VoIP systems by requiring the PSTN gateway (rather than an actual TTY device behind the gateway) to maintain the carrier tone-based connection with the analog device on the PSTN. Within the VoIP network itself, the corresponding communication between the gateway and the VoIP terminal is in the form of text, rather than modem signals. The text stream between the VoIP terminal and the system's PSTN gateway can be transferred to a different VoIP terminal without causing an interruption of the carrier tone between the gateway and the PSTN device.

The Time Division Multiplexed (TDM) architecture that most closely resembles the above-described VoIP technique is the "modem pool" approach that was first implemented commercially a number of years ago. In a typical configuration, a bank of modems, either internal or external to the Private Branch eXchange or PBX, provides a means of exchanging analog-encoded data or facsimile images with interfaces or systems on the trunk side of the PBX. As is true of the VoIP mechanism, analog interfaces and carrier tone support exist only on the outward-facing trunk connection. Within the PBX environment, data are conveyed to and from stations in one of a variety of digitally encoded protocols, rather than by the analog, tones-based protocol used for the external interface. For example, for past AT&T, Lucent, and Avaya systems, the internal PBX protocol used for communicating with a member of the modem pool was Digital Communications Protocol Mode 2 (a synchronous digital interface) or DCP Mode 3 (an asynchronous equivalent).

A deficiency of the VoIP and TDM architectures of the prior art is that problems can arise when analog modem-based devices, such as non-Baudot TTYs, are used within PBX environments. In this configuration, it is important to note that the trunk-facing modems associated with the PBX are not employed. As a result, when modem-based devices within the PBX environment communicate directly with similar devices on the PSTN, calls cannot be transferred or put on hold.

There is a need for a system that permits calls involving modem-based devices within the PBX environment to be transferred and put on hold.

SUMMARY OF THE INVENTION

These and other needs are addressed by the various embodiments and configurations of the present invention. The present invention is directed to the use of paired modems in a TTY-equipped telecommunications system.

In a first embodiment of the present invention, a communication method is provided that includes the following steps:

(a) a first modem receiving a first carrier tone-based text stream from a first TTY device, the first carrier tone-based text stream being defined by a first transmission protocol (which is typically a Bell or ITU protocol);

(b) the first modem converting the first carrier tone-based text stream into a data stream, the data stream being defined by a second (typically non-carrier tone-based) transmission protocol different from the first transmission protocol;

(c) the first modem transmitting the data stream to a second modem;

(d) the second modem converting the data stream to a second carrier tone-based text stream, the second carrier tone-based text stream being defined by the first transmission protocol; and (e) transmitting the second carrier tone-based text stream to a second TTY device.

A "TTY device" refers to a modem-equipped teletypewriter. The TTY device may use any suitable transmission protocol, such as the Baudot protocol or a Bell or ITU protocol.

In one configuration, the invention uses back-to-back modems, positioned in the communication path between the first and second TTY devices, to handle call initiation handshakes and carrier tone maintenance. The attempted transfer of a call from one TTY device to another TTY device or placing a call on hold temporarily interrupts the carrier tone, and therefore automatically and inadvertently disconnects, the call during transfer. One of the modems, typically an outward or trunk-facing modem, maintains communication with the far end TTY device while the call is being transferred within the enterprise. In this manner, the call with the far end TTY device is not disconnected automatically and inadvertently by the temporary loss of carrier tone between the other, or inward-facing, modem and the enterprise TTY device. After the call is transferred to another enterprise component, the component re-establishes carrier tone with the inward-facing modem and, by virtue of the persistently maintained carrier tone between the outward-facing modem, the call is re-established between the enterprise component and the far end TTY device without needing to re-setup the call. By way of example, when an enterprise TTY device initiates a transfer, connectivity with the PSTN TTY device is maintained by the outward-, or trunk-, facing modem while the link between the station-, or inward-, facing modem and enterprise TTY device is broken. A new link is established by the inward-facing modem with the second, or PSTN, TTY device.

Signaling mechanisms between the enterprise TTY device and the switching system, such as a Private Branch eXchange, or PBX, controls the behavior of the trunk-facing modem. Illustratively, a station-originated transfer request would require the trunk-facing modem to maintain its link with the PSTN TTY device while a station-originated drop request would signal the trunk-facing modem to break the link. A station-originated hold request, or a delay in the transfer process, could signal the trunk-facing modem to transmit text streams automatically to the PSTN TTY device, e.g., a periodic "please wait" announcement could be played.

A buffering mechanism could ensure that any information transmitted by the PSTN TTY device during the transfer process will not be lost. This would be achieved by transmitting the buffered information when the new link is established.

In another configuration, the inward-facing modem may be switched to, or is permanently in, a Baudot-only mode in which it generates Dual Tone Multi-Frequency or DTMF signals and Baudot code representations of text. In this manner, a user of a carrier tone-based TTY device can access DTMF interfaces of enterprise components, such as messaging servers, auto-attendants, and interactive response units (such as an Interactive Voice Response or IVR unit). In a dual purpose modem configuration, the user would enter a code on his or her carrier tone-based TTY device indicating that the modem is to switch to the Baudot-only mode or begin generating DTMF-equivalent signals of inputted text. Additional codes would be used to cause the modem to re-enter the carrier tone-based mode and/or stop generating DTMF-equivalent signals. This configuration can permit users to interact, via carrier tone-based TTY devices, with enterprise components that interact only with the Baudot protocol. It can also permit TTY device users to access remotely features using DTMF expressions of feature access codes.

The present invention can provide a number of advantages depending on the particular configuration. The invention can provide equal access of carrier tone-based TTY device users to telephony features and/or contact center services. This can avoid discrimination against such TTY users due to hardware limitations and/or system incompatibilities. Accordingly, such users can experience higher levels of customer satisfaction and more effective usage of telecommunication resources. Unlike computer-based solutions, in which carrier tone is maintained by a PSTN gateway while "transferring" (or redirecting) text packets to a different VoIP terminal, the present invention can afford TTY device users with access to telephony functionality. Service or equipment providers can more fully meet government regulations requiring equal access for TTY users by extending additional and more complete telephony feature operation to such users.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
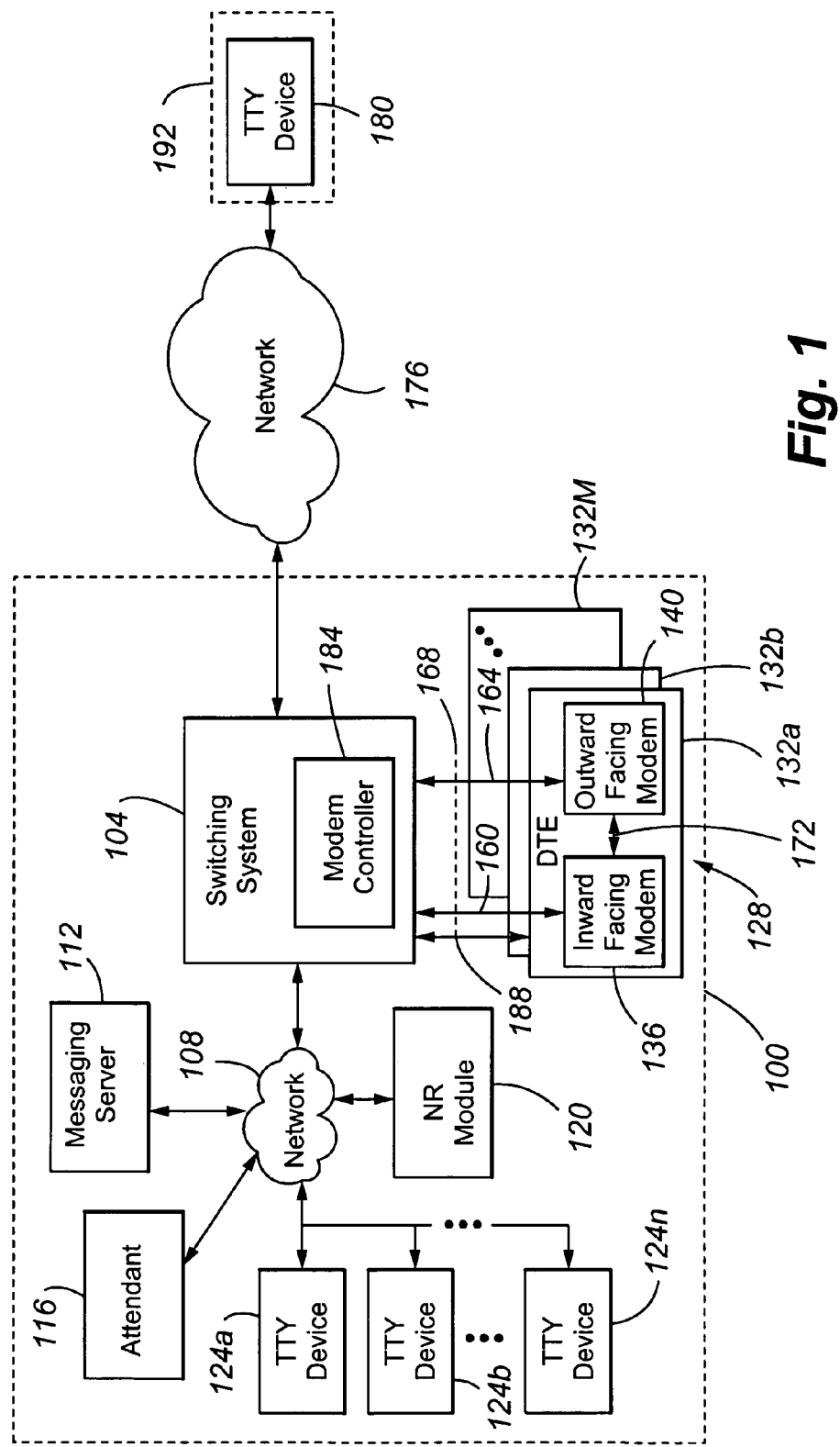
FIG. 1 is a block diagram of an architecture according to a first embodiment of the present invention.

FIG. 1 shows an illustrative embodiment of an enterprise architecture according to the present invention. The enterprise 100 includes a switching system 104, an enterprise network 108, a messaging server 112, a human and/or autoattendant 116, an IVR module 120, a plurality of subscriber TTY communication devices 124a-n, and a pool 128 of back-to-back modems. The architecture 100 may include other components (not shown) such a set of data stores or databases 114 containing contact, customer, and/or subscriber related information and other information that can enhance the value and efficiency of the contact, voice telecommunication devices, and other servers such as a scanner, VoIP software, video contact software, an IP voice server, a fax server, a web server, and an email server. A plurality of subscribers or working agents (not shown) operate the TTY communication devices 124a to n (such as computer work stations or personal computers).

The term "switching system" or "server" as used herein should be understood to include a PBX, an ACD, an enterprise switch, an enterprise server, or other type of telecommunications system switch or server, as well as other types of processor-based communication control devices such as media servers, computers, adjuncts, etc. The switching system 104 can be any integrated or nonintegrated (as shown) architecture for directing contacts to one or more telecommunication devices. Illustratively, the switching system 104 is a modified form of Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switching system is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switching system typically includes a network interface card (not shown) to provide services to the serviced telecommunication devices. Other types of known switches and servers are well known in the art and therefore not described in detail herein.

The enterprise network 108 can be packet- and/or circuit-switched. It is preferably configured as a Local Area Network.

The messaging server 112, IVR module 120, and attendant 116 are conventional.

The TTY devices 124 are preferably carrier tone-based devices, which follow an established protocol such as an ITU or Bell modulation/demodulation protocol and transmits and/or receive data over a communication medium. TTY devices 124 may include or be individually or otherwise paired with telephones or other devices that provide call-control telephony signaling consistent with switching system 104 and/or modem controller 184. The communication medium may be a telephone system (such as the PSTN), private branch exchange (PBX), or other media such as microwave link, coax, or fiber optic cable. ITU modems and Bell modems are examples of suitable TTY devices.

The back-to-back modem pool 128 includes a plurality of pairings of back-to-back modems. Each pair 132a-m includes an inward-facing modem 136 to communicate with internal or subscriber TTY devices 124 and an outward-facing modem 140 to communicate with modems and/or modem-based devices, such as external TTY device 144, located outside the enterprise network. The outward or trunk-facing modem 140 is responsible for handling the handshake and carrier tone maintenance with far-end TTY devices on the network 176. The inward, or station, facing modem 136 performs the same set of functions for devices on the enterprise network 108.

As will be appreciated, in back-to-back modems the Data Terminal Equipment or DTE ports of each modem pair are cross-connected in a "back-to-back" fashion. The modems in a modem pair are coupled together via their DTE interfaces as represented by line 172. This allows the two modems of each pair to interchange data via their respective DTE ports. The DTE may be an adjunct to the switching system 104, integrated into the switching system 104, an external gateway to the switching system 104, and the like. As will be appreciated, additional switching components could be positioned along line 172 allowing even greater configuration flexibility in the modem pool. Anywhere in the connection path between internal or subscriber TTY device 124 and far-end TTY device 180 where a protocol stream must be converted between formats, an interface circuit consistent with the physical and logical needs of the protocols may be present. As depicted in FIG. 1, lines 160 and 164, which are shown as separate lines for purposes of simplicity, represent allocated time slots of a Time-Division Multiplexed bus 168 that couples each modem pair to the switching system 104. Inter-modem communications are preferably done using a text-based protocol, including binary strings of data or other types of information elements that are encapsulated within a data exchange protocol.

In one configuration, each modem of the modem pairs is a "mu-law" modem because each modem couples directly to the above-mentioned time-division multiplexed bus as represented by lines 160 and 164.

The network 176 is preferably a circuit- or packet-switched Wide Area Network, such as the PSTN.

Far-end TTY device 180, which is commonly a part of a second different enterprise network 192, is preferably carrier tone-based and is external to the enterprise network. "External" means that the TTY device is not administered by the switching system 104. Enterprise network 192 could include a modem controller 184 and modem pool 128, depending on the application.

It should be emphasized that the configuration of the switching system, TTY devices, and other elements as shown in FIG. 1 is for purposes of illustration only and should not be construed as limiting the invention to any particular arrangement of elements.

Figure 4:
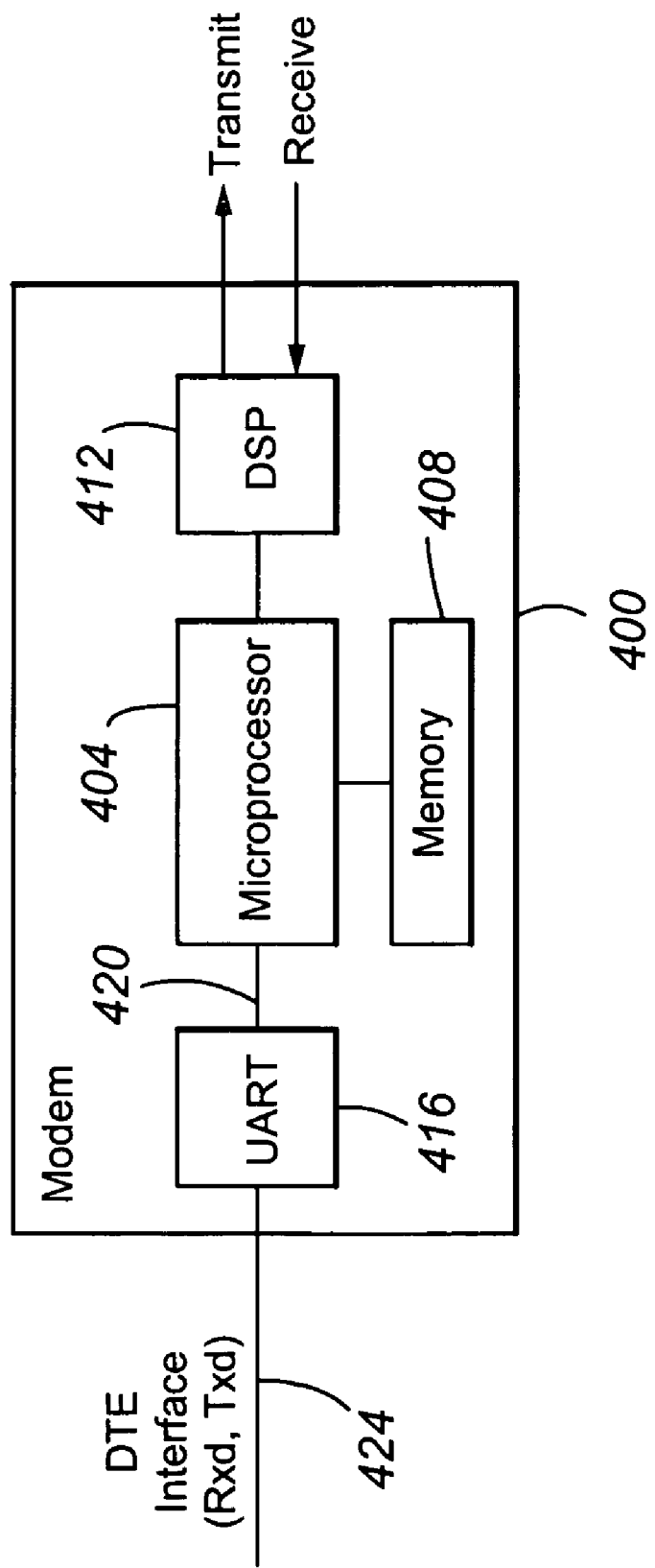
FIG. 4 is a block diagram of a modem according to an embodiment of the present invention.

FIG. 4 shows an illustrative high-level block diagram of a modem in accordance with the principles of the invention. In particular, modem 400 includes a microprocessor 404, memory 408, a Digital Signal Processor or DSP 412, e.g., for providing tone generator/detector and other modem functions, and Universal/Asynchronous Receive Transmit (UART) 416 for providing the DTE interface. Microprocessor 404 is coupled to DSP 412 via line 420, which represents, address, data, control, and status leads. The memory can include selected text messages as mentioned below. The DTE interface 424 is with the other modem in the pair while the transmit and receive channels go towards either of the networks 108 or 176, depending on whether the modem is facing towards the enterprise components or trunks (in the network 176), respectively. Other DTE protocols and implementations that provide equivalent functionality could be used.

The back-to-back modems act cooperatively to maintain a constant carrier tone between the outward, or trunk, facing modem 140 and the TTY device 180 during switch-controlled operations, such as call transfers and call holds, that would, in the absence of a back-to-back modem pair, interrupt the carrier tone and cause disconnection of the call with the TTY device 180. Thus, the call is maintained even during periods when the carrier tone is lost between the inward-facing modem 136 and a device on the enterprise network 108. When the carrier tone between the inward-facing modem 136 and internal TTY device 124, messaging server 112, attendant 116, or IVR module 120 is interrupted, the selected device re-establishes the carrier tone with another of the inward-facing modems 136 after the switch-controlled operation has been completed. Illustratively, when an enterprise TTY device 124 user initiates a transfer, connectivity with the TTY device 180 will be maintained by the trunk-facing modem 140 while the link between another station-facing modem 136 and the internal TTY device 124 is broken, and a new link established between the station-facing modem 136 and the internal TTY device 124.

To control the operations of a pair of modems 132, the switching system includes a modem controller 184 and a control channel 188 extending between the switching system 104 and each pair of modems 132 in the modem pool 128. The modem controller 184 monitors ordinary signaling mechanisms between the enterprise TTY device 124 and the switching system 104 and, in response, issues appropriate commands to the inward and outward-facing modems 136 and 140. Illustratively, a call transfer originated by an internal TTY device 124 would generate a "call transfer request" and an appropriate number to which the call is to be transferred. The modem controller 184 commands the trunk-facing modem 140 to maintain its link with the far-end TTY device 180, while the call transfer is performed. For a call drop request originated by the internal TTY device 124, the modem controller 184 would signal the trunk-facing modem 140 to break the link, or interrupt the carrier tone, between the modem 140 and the TTY device 180. A hold request or delay in transfer originated by the TTY device 124 would cause the controller 184 to signal the trunk-facing modem 140 to maintain carrier and possibly transmit text streams automatically to the TTY device 180. An example of such a message stream is a periodic "please wait" announcement.

To set up a call, the switching system 104 initiates call setup in response to receipt of a dialed number from a TTY device 124. The outward-facing modem 140 contacts the TTY device 180 and performs a handshake. When the handshake is completed, the outward-facing modem 140 signals the inward-facing modem 136 to initiate a handshake with the calling TTY device 124. In this configuration, whenever any port of the switching system 104 detects an attempted handshake, a pair of modems is allocated automatically to the call. In this implementation, a modem pair may be dedicated to each port to detect an incoming handshake signal. A subset of the ports may be associated with a dedicated number to be used only by TTY users.

In another embodiment, two-stage dialing is employed to establish a call between the calling TTY device 124 and the called TTY device 180. The subscriber using the calling TTY device 124 first dials a number, such as "8" to access a modem pair in the modem pool 128. When the modem pair is allocated to the call, a secondary dial tone is provided to the subscriber. If no modem pair is available, a busy signal, which may be text and/or voice, is provided to the calling TTY device 124. The subscriber then dials the number of the TTY device 180. The handshake exchange is first performed between the TTY device 124 and the inward-facing modem 136 and, when the call is initiated to the TTY device 180, between the outward-facing modem 140 and the TTY device 180.

Figure 2:
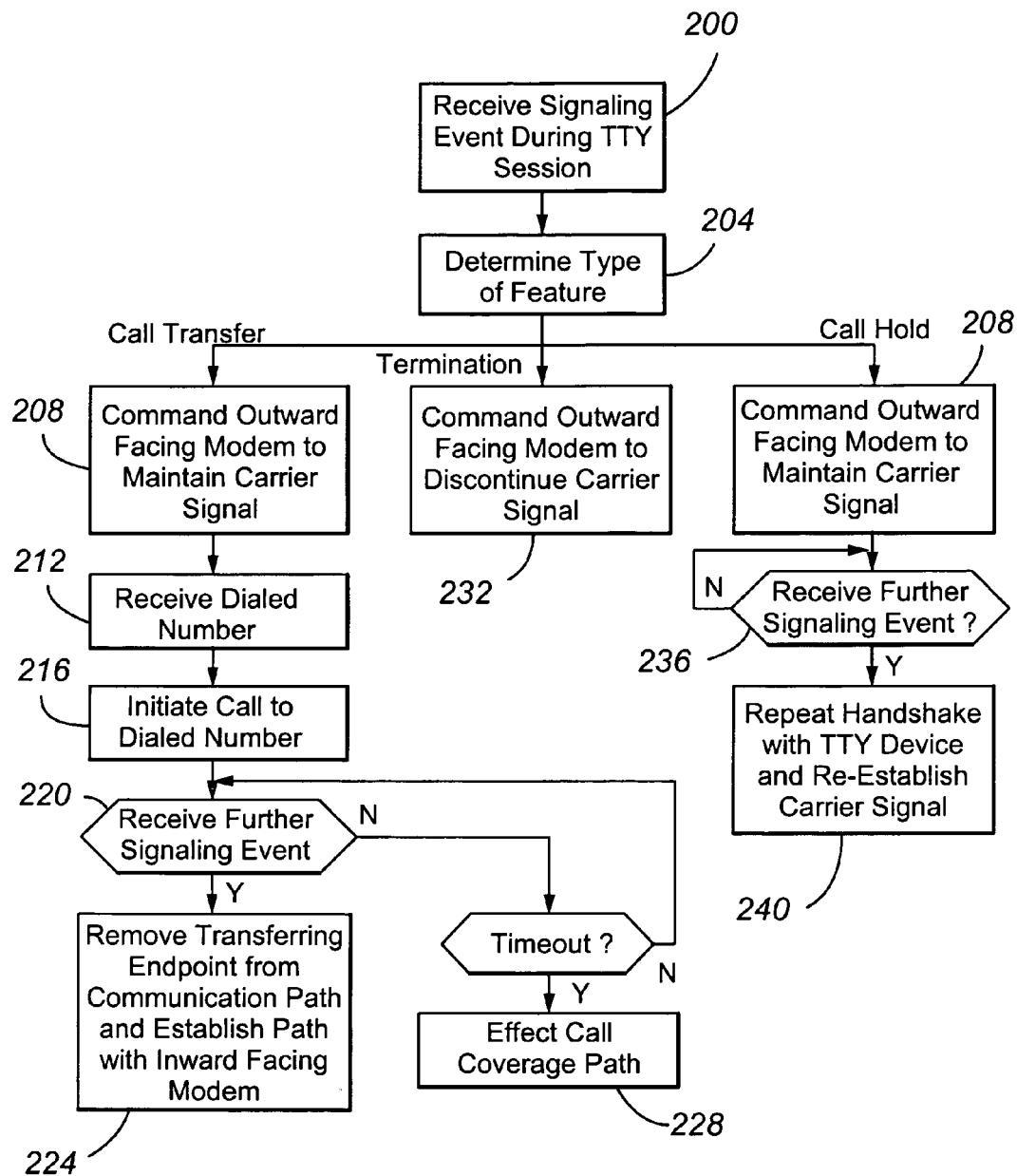
FIG. 2 is a flowchart of a modem controller according to the first embodiment.
Figure 3:
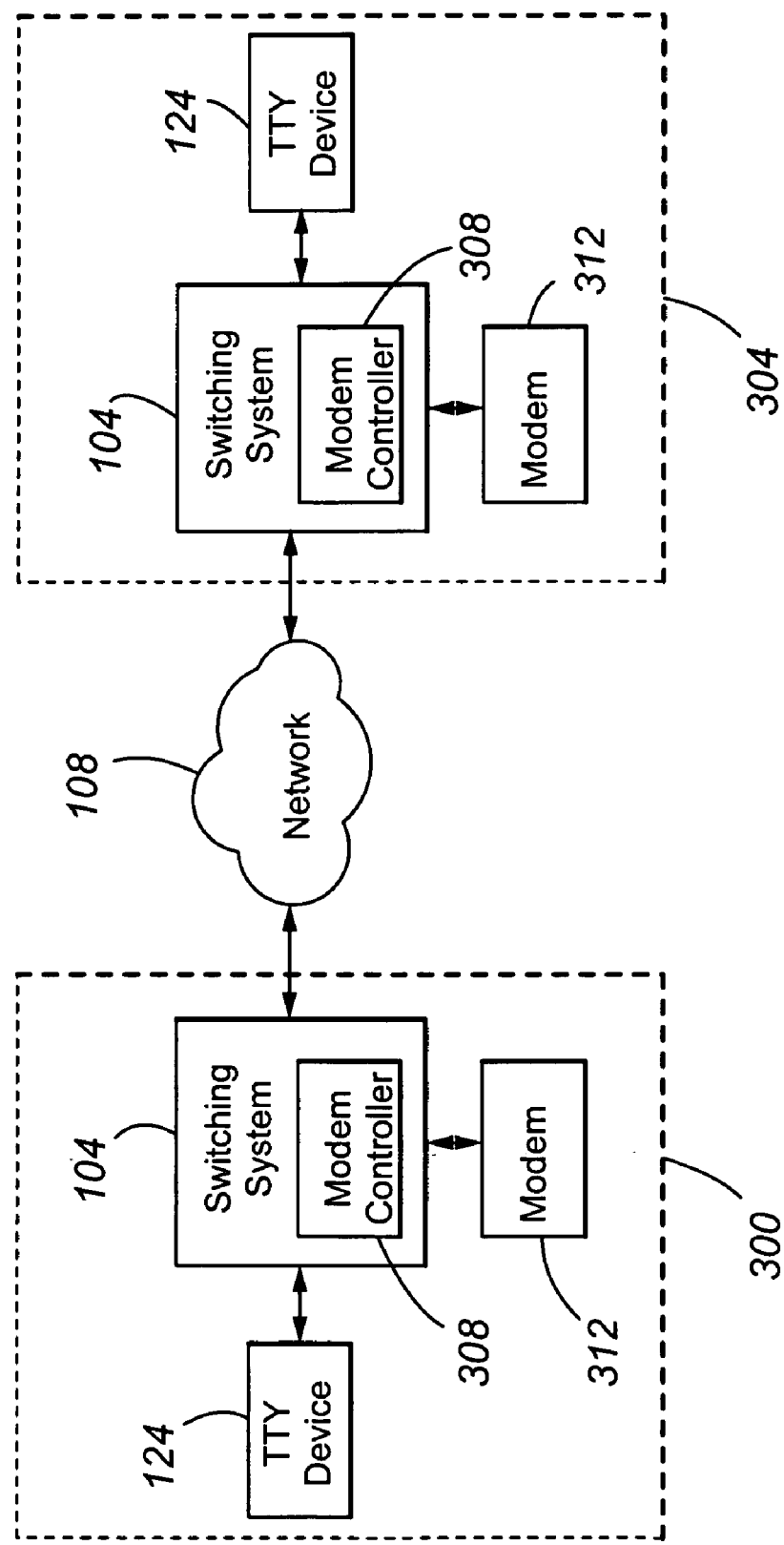
FIG. 3 is a block diagram of an architecture according to a second embodiment of the present invention.

The operation of the modem controller 184 will now be discussed with reference to FIG. 2. In FIG. 2, call transfer, termination, and call hold are illustrative only. Other functional sequences may be followed to implement additional telephony features supported by switching system 104 and/or modem controller 184.

In step 200, the modem controller 184 is notified that the subscriber of a TTY device 124, during an existing session or call with an external TTY device 180, has initiated a signaling event, such as by invoking a telephony feature.

In step 204, the modem controller 184 determines the type of signaling event, or type of feature, invoked.

When the signaling event is a call transfer request, the modem controller follows the logic branch on the far left of FIG. 2. In step 208, the modem agent commands out-of-band the outward-facing modem 140, in a selected modem pair in the communication path between the TTY devices 124 and 180, to maintain carrier tone notwithstanding loss of carrier tone by the inward-facing modem 136. In step 212, the switching system 104 may receive from the subscriber, a dialed number to which the call is to be transferred. As will be appreciated, when the "call transfer" button is first pressed the subscriber may receive a secondary dial tone to dial the desired number to which the call is to be transferred. In step 216, the switching system 104 initiates a call to the dialed number. Call initiation includes not only establishing connection between the transferring TTY device and the dialed enterprise component but also completing the handshake procedure therebetween. At this point, there is no connection between the TTY device and inward-facing modem. In decision diamond 220, the switching system 104 determines whether a further signaling event has been received. Typically, the further signaling event is a further "call transfer" command. When the signaling event is received, the transferring TTY device 124, in step 224, is removed automatically from the communication path with the component to which the call is to be transferred. Because carrier tone has been lost between the TTY device 124 and the component and between the inward-facing modem and the TTY device 124, no carrier tone-based connections exist among the enterprise components. To establish a direct connection between the transferee component and the inward-facing modem, the transferee component and the inward-facing modem 136 complete the handshake procedure. When the further signaling event is not received or the dialed component fails to answer within a selected period of time, the switching system timeouts and the call, in step 228, is processed according to call coverage set up for the dialed component. Call coverage, for example, may require the call to be transferred to the messaging server 112 to leave a text message for the subscriber associated with the dialed component. Additionally, the modem controller, or outward modem, can send a recurring text message to the TTY device 180.

When the signaling event is a call disconnect command, the modem controller follows the logic branch in the middle of FIG. 2. In that event, the modem controller in step 232 commands the outward-facing modem 140 to interrupt or drop the carrier tone between the outward-facing modem 140 and the TTY device 180, thereby disconnecting the call with the TTY device 180. In one configuration, step 208 is performed but step 232 is not performed. The outward-facing modem 140 assumes that, unless a contrary command is received within a selected time of carrier tone interruption between the inward-facing modem and an enterprise component, the carrier tone with the TTY device 180 is to be dropped. In another configuration, step 232 but not step 208 is performed because the outward-facing modem 140 assumes that the carrier tone is to be maintained unless a contrary command is received within a selected time of carrier tone interruption between the inward-facing modem and an enterprise component.

When the signaling event is a call hold request, the modem controller follows the logic branch on the far left of FIG. 2. In step 208, the modem agent commands the outward-facing modem 140, in a selected modem pair in the communication path between the TTY devices 124 and 180, to maintain carrier tone notwithstanding loss of carrier tone by the inward-facing modem 136. In decision diamond 236, the switching system 104 determines whether a further signaling event has occurred. Typically, the further signaling event is the subscriber again depressing the hold button to cause the call to be taken off hold. If not, the switching system 104 returns to decision diamond 236. If the further signaling event has occurred, the modem controller 184 commands the inward-facing modem 136 to repeat the handshake procedure with the respective subscriber's TTY device 124 to re-establish the carrier tone.

In another embodiment, first and second enterprise networks 300 and 304 are depicted. Each enterprise network includes a switching system 104, a modem controller, 308, an inward-facing modem 312, and a TTY device 124. The enterprise networks are further interconnected by network 108. The inward-facing modems 312 maintain and re-establish carrier tone with its respective TTY device in response to telecommunication operations as noted above.

Text information for the communication between the TTY devices is exchanged between the modems 312 in the first and second enterprise networks 300 and 304 through a data (text) exchange protocol suitable for circuit-switched networks. Examples of suitable text-based protocols include fax transmission standards. For example, the following standards specify the fax data rate and modulation schemes: ITU V.17 defines half-duplex 14.4 kbps modulation; ITU V.29 defines half-duplex 9.6 kbps modulation; and ITU V.27ter defines half-duplex 4.8 kbps modulation. In addition to the specification of the fax data rate and modulation schemes, ITU T.4 defines the fax image encoding scheme, generally know as Group 3. Most fax equipment or services currently provided are Group 3 faxes. Group 2 and Group 1 fax schemes, as specified by ITU T.3 and T.2, respectively, are much older, slower and simpler. As a result, for the purposes of the following description, Group 3 fax is assumed. Finally, ITU V.21 channel 2 specifies a 300 bps frequency-shift-keying (FSK) modulation used during fax handshaking procedures, which are specified in ITU T.30. The latter defines five phases of a fax call: call establishment, pre-message, message transmission, post message, and call release. Fax handshaking occurs during all phases except the message transmission phase, during which time the Group 3 encoded data is transmitted using one of the above mentioned fax modulation schemes. The function of handshaking, among other things, is to allow each fax endpoint to determine the capabilities of the opposite fax endpoint such as highest supported data rate, page resolution, page size, etc. It should be noted that the ITU T.30 fax handshaking protocol allows for manual operation, where a user can originate or answer a call using a phone connected to the fax device, and then switch to fax mode, and an automatic mode of operation.

When the call is to be terminated or disconnected, the switching system 104 on the end at which the first TTY device changes to an on-hook, or disconnected state, sends a disconnect request out-of-band to the other switching system 104. In response, the modem controller in the other switching system 104 commands in-band its respective modem to drop carrier tone with the internal TTY device. Alternatively, the modem controller on the side of the disconnecting TTY device can instruct its respective modem to send to the far end modem a text command to disconnect the call. Alternatively, the disconnect command can be sent out-of-band between the two switching systems. As will be appreciated, existing signaling protocols and standards govern the exchange of telecommunication information between switches of differing enterprise networks.

In yet another embodiment, the inward-facing modem is configured to operate in the Baudot protocol alone or in both the Baudot protocol and carrier tone-based protocol(s). In the latter case, the inward-facing modem is a dual purpose modem that has discrete first and second modes, each mode corresponding to one of the Baudot protocol and carrier tone-based protocol. For example, a user of external TTY device 180 can input a mode identifier indicating when he or she desires to be in the Baudot-only or carrier tone-based protocol. In response, the inward-facing modem enters into the desired mode. Alternatively, the modem controller 184, which will have access to the capabilities of the internal enterprise component connected to the TTY device 180, can, when the device is a Baudot only device, command the inward-facing modem 136 to enter the Baudot only mode. As will be appreciated, when in the Baudot only mode the inward-facing modem, in connection with the outward-facing modem, translate carrier tone-based text signals into corresponding Baudot text signals. In this embodiment, the outward-facing modem 140 handles the handshake with the external carrier tone-based TTY device.

In either configuration, the TTY device can provide a DTMF indicator, such as "*24" that would indicate to the outward-facing modem that the following text character should be configured into a corresponding DTMF signal generated by the inward-facing modem (when in the Baudot mode). The outward-facing modem can command the inward-facing modem to generate the DTMF signal via the line 172. In this manner, the TTY user could interact with the messaging server 112, attendant 116, or IVR module 120, using a mixture of Baudot and DTMF signals, even when his or her device is carrier tone-based and not a Baudot-compatible device and notwithstanding the fact that the messaging server, attendant, or IVR module or other type of auto response unit is existing Baudot-compatible only. This configuration could also support remote telephony feature invocation using DTMF signals generated by the inward-facing modem 136 when in the Baudot mode. Feature invocation is done using DTMF equivalents to feature access codes.

This embodiment can overcome the differences between carrier tone-based and Baudot protocols, which currently make such devices incompatible with one another. As will be appreciated, the differences include: (1) Baudot TTYs encode text characters with the five bit Baudot code, while carrier tone-based TTYs use an ASCII encoding, also known as the ANSI X3.4-1977 or ASCII-77 encoding, (2) Baudot TTYs, unlike carrier tone-based TTYs, do not provide for parity bits, (3) Baudot TTYs in the United States transmit/receive only at 45.45 bits per second, and (4) Baudot TTYs, unlike carrier tone-based TTYs, use frequency shift keying modulation/demodulation at frequencies of 1400 and 1800 Hz.

A number of variations and modifications of the invention can be used. It would be possible to provide for some features of the invention without providing others.

For example in one alternative embodiment, the memory 408 of the outward-facing modem buffers signals received from a far-end TTY device while the telecommunication operation, causing loss of carrier tone within the enterprise network, is being performed. This embodiment is particularly important for a TTY conference call among more than two participants. The buffered information is transmitted to the inward-facing modem, and to its enterprise component, when the inward-facing modem and its enterprise component (re-) establish contact.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A communication method, comprising:
   a first modem receiving a first carrier tone-based text stream from a first TTY device, the first carrier tone-based text stream being defined by a first transmission protocol;
   the first modem converting the first carrier tone-based text stream into a data stream, the data stream being defined by a second transmission protocol different from the first transmission protocol;
   the first modem transmitting the data stream to a second modem;
   the second modem converting the data stream to a second carrier tone-based text stream, the second carrier tone-based text stream being defined by the first transmission protocol;
   transmitting the second carrier tone-based text stream to a second TTY device, wherein the first and second TTY devices are connected, via the first and second modems, to effect a phone call between a first user of the first TTY device and a second user of the second TTY device, wherein the first and second modems are part of a common enterprise network, wherein the second transmission protocol is not carrier tone-based, wherein the carrier tone between the first TTY device and first modem is interrupted during a selected time interval; and
   during the selected time interval, the second modem maintaining a continuous carrier tone with the second TTY device.

2. The method of claim 1, wherein the first and second TTY devices are ASCII modems, wherein the first and second modems are back-to-back modems, and wherein the first modem is inward-facing towards the first TTY device and the second modem is outward-facing towards the second TTY device.

3. The method of claim 1, wherein the carrier tone between the first TTY device and first modem is interrupted by at least one of a call transfer, a call hold, or other similar telephony feature.

4. The method of claim 3, wherein, after the carrier tone is interrupted and during the time interval, the carrier tone is re-established between the first TTY device and first modem.

5. The method of claim 3, wherein the carrier tone is interrupted by a call transfer and further comprising:
   a switching system, in response to receiving a call transfer request from the first user, commanding the second modem to perform the step of maintaining a continuous carrier tone.

6. The method of claim 3, wherein the carrier tone is interrupted by a call hold and further comprising:
   a switching system, in response to receiving a call hold request from the first user, commanding the second modem to perform the step of maintaining a continuous carrier tone.

7. The method of claim 6, wherein a memory of at least one of the first and second modems comprises a set of predetermined TTY messages and further comprising:
   the switching system, in response to receipt of the hold request, commanding the at least one of the first and second modems and/or a modem controller to forward a selected one of the predetermined TTY messages to the second TTY device.

8. The method of claim 3, further comprising, after the time interval:
- a switching system receiving a call disconnect signal; and
- the switching system commanding the second modem to interrupt the carrier tone between the second modem and the second TTY device.

9. The method of claim 1, further comprising:
- a switching system receiving, from the first TTY device, a dialed number of the second TTY device;
- the second modem performing a handshake with the second TTY device;
- the second modem signaling the first modem to initiate a handshake with the first TTY device; and
- the first modem initiating a handshake with the first TTY device to complete the call.

10. The method of claim 1, wherein the first modem, in a first mode, generates a text stream in accordance with the first transmission protocol and in a second mode generates a text stream in accordance with the Baudot protocol, wherein the first modem is in the second mode, and further comprising:
- the second TTY device transmitting a third carrier tone-based stream to the second modem;
- the second modem converting the third carrier tone-based stream into a second data stream;
- the second modem transmitting the second data stream to the first modem; and
- the first modem converting the second data stream into at least one of Dual Tone Multi-Frequency or DTMF and Baudot codes.

* * * * *

UNITED STATES PATENT AND TRADEMARK OFFICE
CERTIFICATE OF CORRECTION

PATENT NO. : 8,031,842 B1  
APPLICATION NO. : 11/482027  
DATED : October 4, 2011  
INVENTOR(S) : Paul Roller Michaelis and Richard A. Windhausen Page 1 of 1

It is certified that error appears in the above-identified patent and that said Letters Patent is hereby corrected as shown below:

Title page, item (54) and Col. 1 title delete the word "MODERN" and replace it with the word --MODEM-- therein.

Signed and Sealed this
Twelfth Day of June, 2012

David J. Kappos
*Director of the United States Patent and Trademark Office*